United States Patent
Hishinuma et al.

(10) Patent No.: US 8,239,712 B2
(45) Date of Patent: Aug. 7, 2012

(54) COMPUTER SYSTEM AND MEMORY USE SETTING PROGRAM

(75) Inventors: Takeo Hishinuma, Kawasaki (JP); Yoshinori Mesaki, Kawasaki (JP); Osamu Ishibashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/570,054

(22) Filed: Sep. 30, 2009

(65) Prior Publication Data

US 2010/0088559 A1    Apr. 8, 2010

(30) Foreign Application Priority Data

Oct. 3, 2008  (JP) .................................. 2008-258975

(51) Int. Cl.
*G11C 29/00*    (2006.01)
(52) U.S. Cl. ........................ 714/723; 714/718
(58) Field of Classification Search .................. None
See application file for complete search history.

(56) References Cited

U.S. PATENT DOCUMENTS

| | | | |
|---|---|---|---|
| 4,380,066 A * | 4/1983 | Spencer et al. ............... 714/6.1 |
| 6,405,323 B1 * | 6/2002 | Lin et al. ..................... 714/6.13 |
| 6,445,602 B1 * | 9/2002 | Kokudo et al. ................ 365/45 |
| 6,763,425 B1 * | 7/2004 | Pereira ......................... 711/108 |
| 6,781,898 B2 * | 8/2004 | Kim et al. ..................... 365/200 |
| 7,055,054 B2 * | 5/2006 | Olarig ........................... 714/5.11 |
| 7,275,190 B2 * | 9/2007 | Roohparvar ................. 714/723 |
| 7,757,153 B2 | 7/2010 | Hwang et al. |
| 2006/0098484 A1 | 5/2006 | Roohparvar |
| 2008/0189481 A1 | 8/2008 | Mayer et al. |

FOREIGN PATENT DOCUMENTS

| | | |
|---|---|---|
| CN | 1805049 A | 7/2006 |
| JP | 05-20207 A | 1/1993 |
| JP | 05-37969 A | 2/1993 |
| KR | 10-2006-91358 A | 8/2006 |
| KR | 10-719380 B1 | 5/2007 |

OTHER PUBLICATIONS

European Search Report dated Jul. 28, 2010, issued in corresponding European Patent Application No. 09170309.0.
Mehrara M. et al.; "Reliability-Aware Data Placement for Partial Memory Protection in Embedded Processors"; ACM Sigplan Workshop on Memory Systems Performance and Correctness MSPC 2006; Oct. 22, 2006, San Jose, California, USA, New York , NY: ACM LNKD-; Oct. 22, 2006, pp. 11-18, XP0022533444, p. 11, left-hand column, line 1—p. 14, right-hand column, line 18.
Korean Office Action dated Mar. 11, 2011, issued in corresponding Korean Patent Application No. 10-2009-0093107.
Chinese Office Action dated Jun. 2, 2011, issued in corresponding Chinese Patent Application No. 200910179136.2.

* cited by examiner

*Primary Examiner* — Guerrier Merant
(74) *Attorney, Agent, or Firm* — Westerman, Hattori, Daniels & Adrian, LLP

(57) ABSTRACT

A computer system including: a memory configured to store various kinds of data; a use setting data memory means for storing use setting data indicating a use of each of a plurality of memory blocks into which the memory is divided by a certain length; a memory diagnosis means for diagnosing the memory so as to detect a bad area in each of the memory blocks; and a memory use setting means for setting the use setting data of each of the memory blocks stored in the use setting data memory means in accordance with a result of detecting the bad area in each of the memory blocks by means of the memory diagnosis means.

5 Claims, 8 Drawing Sheets

FIG. 4

| Memory block | Use |
|---|---|
| 201 | for program |
| 202 | for program |
| 203 | for Graphics |
| 204 | for Graphics |
| 205 | for Graphics |
| 206 | for program |
| 207 | for Voice |
| 208 | for program |
| 209 | for program |
| 210 | for program |

| memory quality level | USE |
|---|---|
| level 1 (including multiple bad bits) | for Voice data |
| level 2 (including a single bad bit) | for Graphics data |
| level 3 (no bad area at all) | for Program data |

| memory Block | Use | memory diagnosis result | Use after change |
|---|---|---|---|
| 201 | for Program | level 3 | for Program |
| 202 | for Program | level 2 | for Graphics |
| 203 | for Graphics | level 2 | for Graphics |
| 204 | for Graphics | level 2 | for Graphics |
| 205 | for Graphics | level 3 | for Graphics |
| 206 | for Program | level 3 | for Program |
| 207 | for Voice data | level 3 | for Program |
| 208 | for Program | level 3 | for Program |
| 209 | for Program | level 3 | for Program |
| 210 | for Program | level 1 | for Voice data |

FIG. 7

| memory Block | Use | memory diagnosis result | Use after change |
|---|---|---|---|
| 201 | for Program | level 3 | for Program |
| 202 | for Program | level 2 | for Graphics |
| 203 | for Graphics | level 3 | for Graphics |
| 204 | for Graphics | level 2 | for Graphics |
| 205 | for Graphics | level 2 | for Graphics |
| 206 | for Program | level 3 | for Program |
| 207 | for Voice data | level 3 | for Program |
| 208 | for Program | level 3 | for Program |
| 209 | for Program | level 3 | for Program |
| 210 | for Program | level 1 | for Voice data |

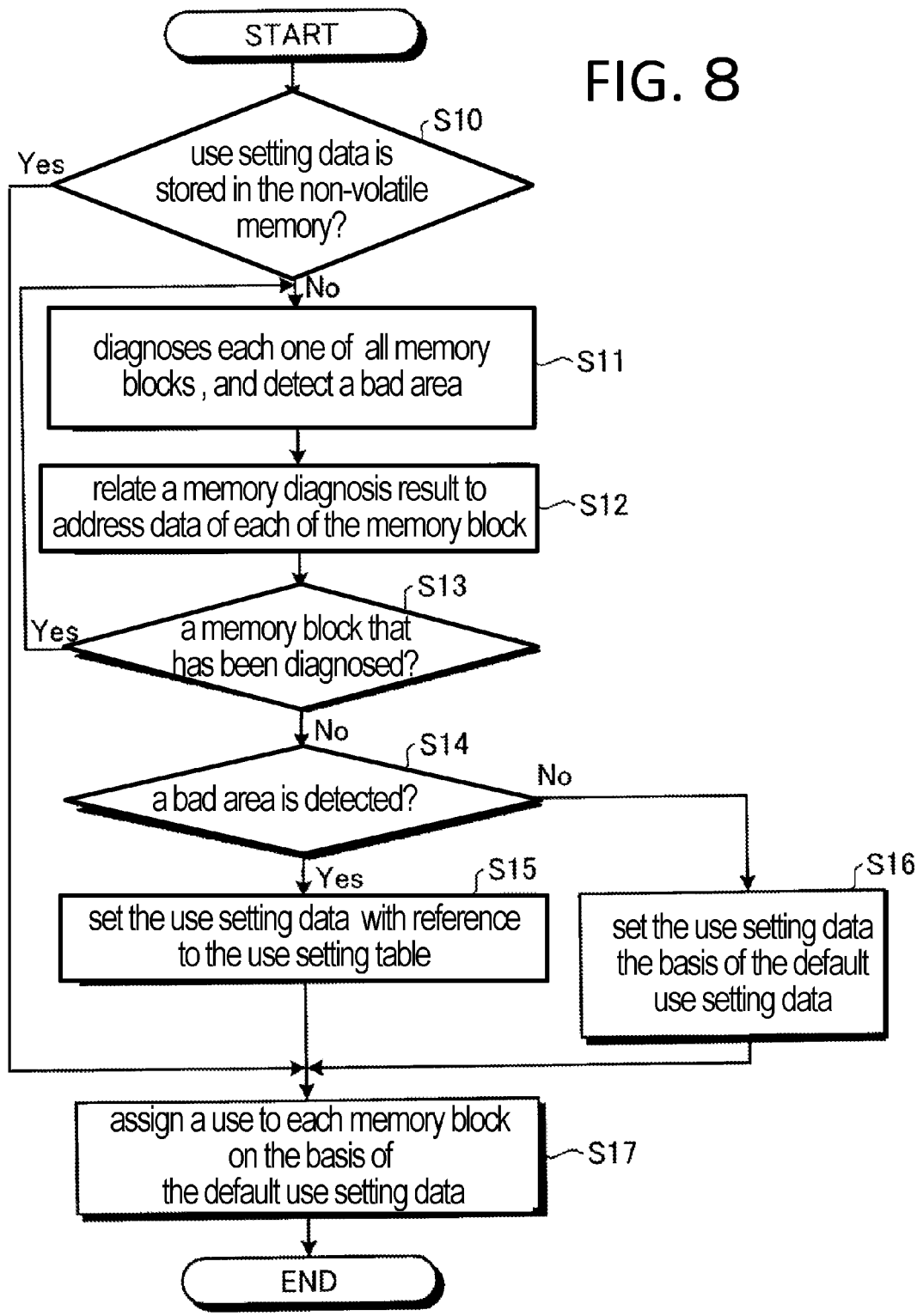

COMPUTER SYSTEM AND MEMORY USE SETTING PROGRAM

CROSS REFERENCE TO RELATED APPLICATION

This application is based upon and claims the benefit of priority from the prior Japanese Patent Application NO. 2008-258975 filed on Oct. 3, 2008, the entire contents of which are incorporated herein by reference.

FIELD

The embodiments discussed herein are related to a computer system and a memory use setting program to effectively use each memory block included in a main memory.

BACKGROUND

An ordinary computer system configured to diagnose a main memory, to detect a bad area in each of memory blocks into which an area of the main memory is divided by a certain length, and to identify a memory block in which a bad area is detected as a bad block is known, e.g., as disclosed in Patent document 1 and Patent Document 2.
[Patent Document 1]
Japanese Laid-open Patent Publication No. 05-37969
[Patent Document 2]
Japanese Laid-open Patent Publication No. 05-20207

The computer system of this kind is configured not to allow use of an identified bad block, and to use a normal memory block only other than the bad block in the main memory.

As the computer system does not use a bad block at all, generally, however, the computer system may not effectively use the whole main memory.

SUMMARY

According to an aspect of the embodiments, a computer system includes: a memory configured to store various kinds of data, a use setting data memory means for storing use setting data indicating a use of each of a plurality of memory blocks into which the memory is divided by a certain length, a memory diagnosis means for diagnosing the memory so as to detect a bad area in each of the memory blocks, and a memory use setting means for setting the use setting data of each of the memory blocks stored in the use setting data memory means in accordance with a result of detecting the bad area in each of the memory blocks by means of the memory diagnosis means.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

BRIEF DESCRIPTION OF THE DRAWINGS

FIG. 4 illustrates in detail use setting data illustrated in FIG. 1.
FIG. 5 illustrates in detail a use setting table illustrated in FIG. 1.
FIG. 6 illustrates an example of a process for setting the use setting data by means of the memory use setting means.
FIG. 7 illustrates another example of the process for setting the use setting data by means of the memory use setting means.
FIG. 8 is a flowchart illustrating a procedure of a memory use setting process of the computer system of the embodiment.

DESCRIPTION OF THE PREFERRED EMBODIMENTS

Figure 1:
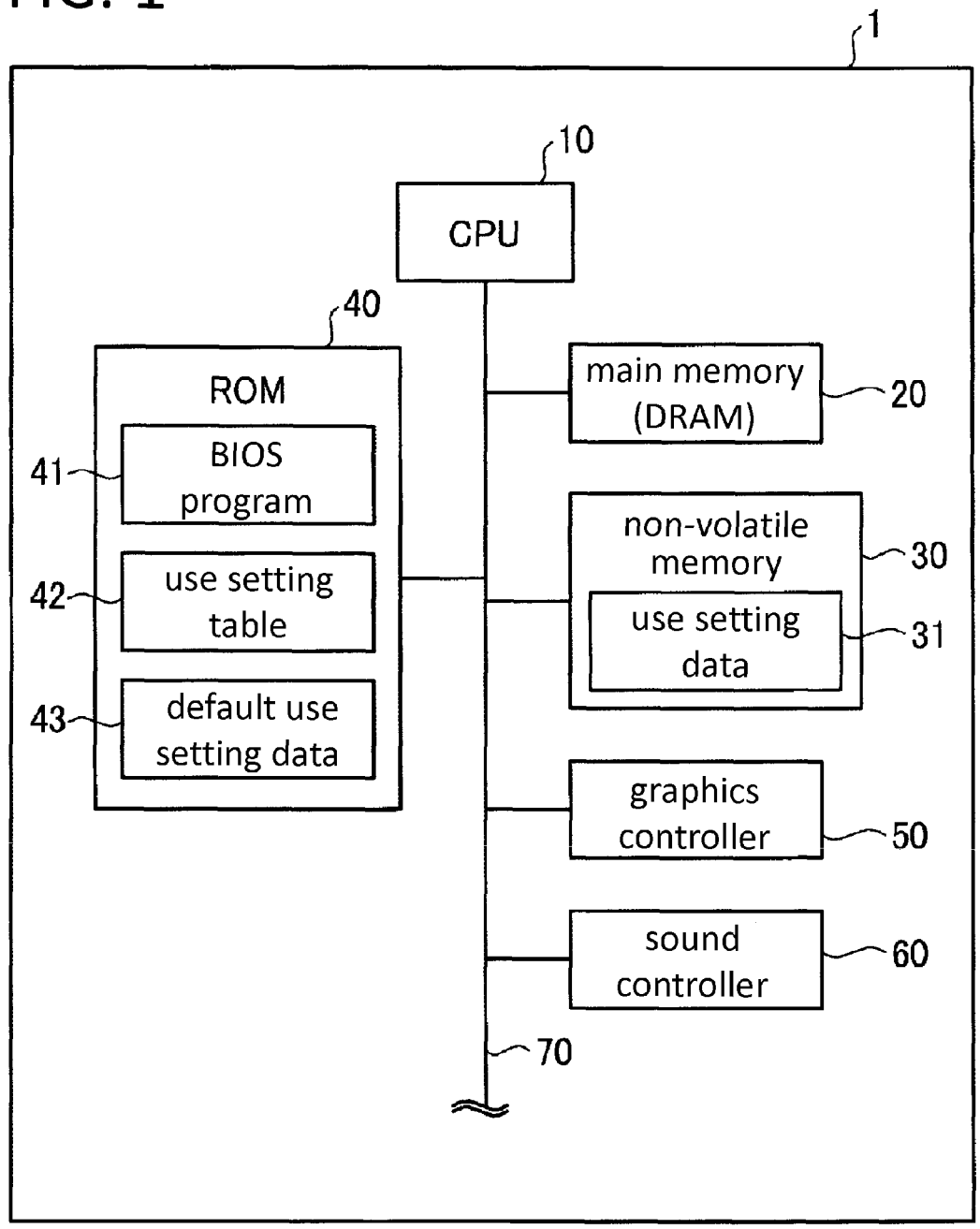
FIG. 1 is a functional block diagram illustrating a configuration of a computer system according to an embodiment of the present invention.

Hereinafter, a preferable embodiment of a computer system and a memory use setting program which the present invention discloses will be described in detail with reference to the drawings.

First, an outline of the computer system of the embodiment will be explained. The computer system of the embodiment has a memory configured to store various kinds of data, a use setting data memory means for storing use setting data indicating a use of each of a plurality of memory blocks into which the memory is divided by a certain length, a memory diagnosis means for diagnosing the memory so as to detect a bad area in each of the memory blocks, and a memory use setting means for setting the use setting data of each of the memory blocks stored in the use setting data memory means in accordance with a result of detecting the bad area in each of the memory blocks by means of the memory diagnosis means.

That is, each of a plurality of memory blocks, into which a main memory of the computer system of the embodiment such as a DRAM (dynamic random access memory) is divided by a certain length, is assigned a proper use.

More specifically, use setting data indicating the use of each of the memory blocks included in the main memory is stored in a use setting data memory means that is a non-volatile memory inside the computer system such as a flash memory.

The use of each of the memory blocks includes various uses such as a use for developing a certain program, a use for storing graphics data or voice data, and so on.

Moreover, the memory diagnosis means of the embodiment diagnoses the main memory so as to detect a bad area in each of the memory blocks before each of the memory blocks is assigned a use. The bad area is an area in each of the memory blocks having a bad bit on which a memory function such as reading and writing data does not properly work.

The memory block including a bad area (called a "bad block" hereafter) includes a plurality of bad blocks of different number of bad bits from a slightly bad block of a relatively small number of bad bits to a severely bad block of a relatively large number of bad bits. Even in a case where the bad block is slightly bad, it is not preferable to use the slightly bad block as an area in which a program and so on is developed from a viewpoint of making sure that the program normally works.

It is allowable, however, to use the slightly bad block as an area in which graphics data or voice data is stored. That is based on empirical knowledge that, even if a bad block exists in a memory block for storing graphics data or voice data but the number of bad bits included in the bad block is small, reproducing an image or voice by actually using the graphics or voice data by means of various devices does not cause quality degradation of the image or voice.

Thus, the memory use setting means of the embodiment is configured to set use setting data of each of the memory blocks stored in the use setting data memory means in accordance with a result of detecting the bad area in each of the memory blocks by means of the memory diagnosis means. Hence, even in a case where a bad block exists in the memory blocks included in the main memory, each of the memory blocks including the bad block may be assigned a proper use without preventing the bad block from being used.

As to the embodiment, as described above, the use setting data indicating the use of each of the memory blocks, into which the memory area is divided by a certain length, is stored in the non-volatile memory. The memory is diagnosed so that a bad area is detected in each of the memory blocks. Then, the use setting data of each of the memory blocks stored in the non-volatile memory is set in accordance with a result of detecting a bad area in each of the memory blocks. As the computer system of the embodiment is configured as described above, the computer system may assign a proper use not only to a normal memory block of the main memory but also to a slightly bad block in which the number of bad bits is relatively small, so as to effectively use each of the memory blocks included in the main memory.

The memory diagnosis means and the memory use setting means may be implemented by, e.g., a BIOS program that the CPU reads from the ROM and runs upon the computer system being activated.

Figure 2:
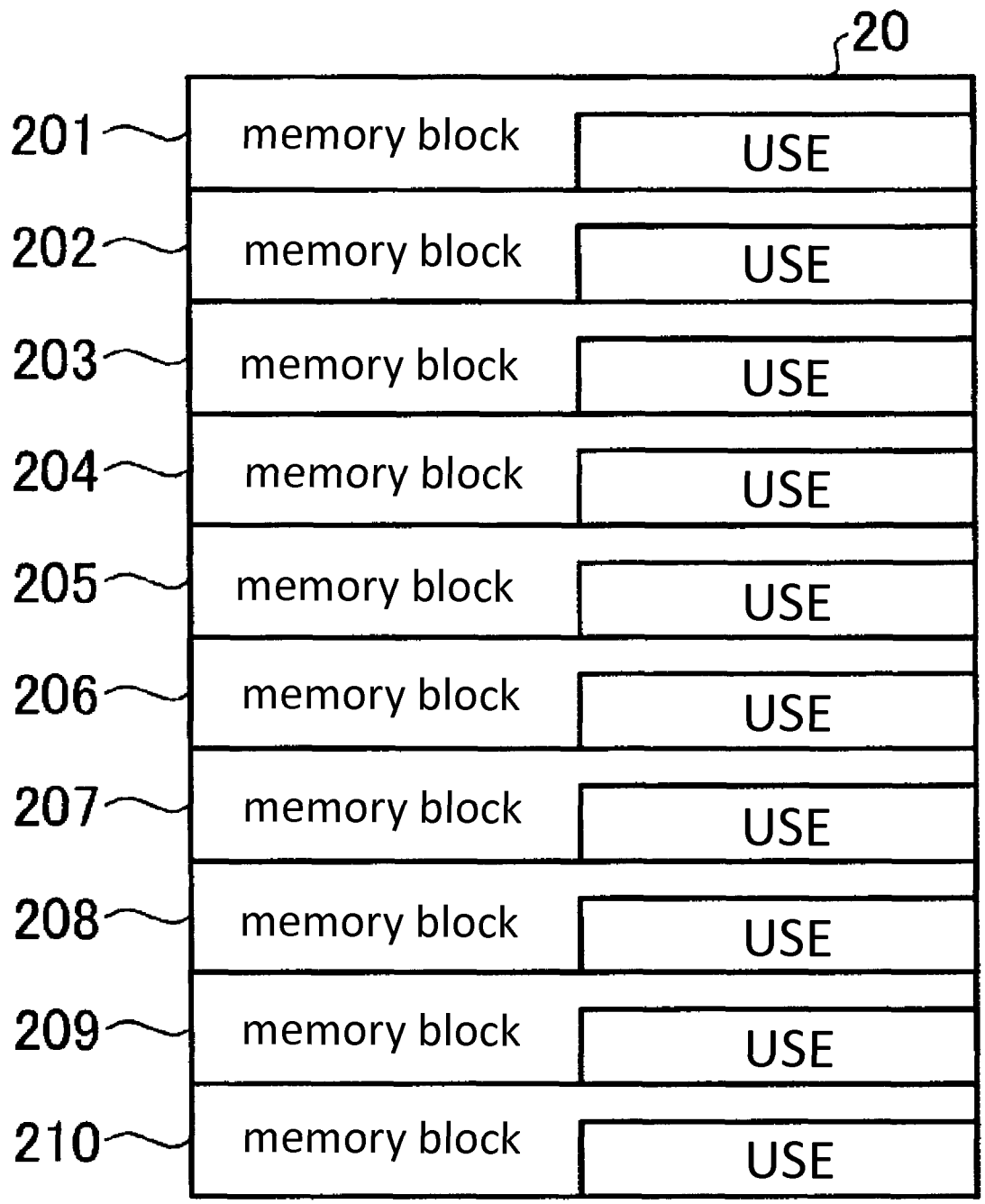
FIG. 2 illustrates in detail a DRAM illustrated in FIG. 1.

Then, a configuration of the computer system of the embodiment will be explained with reference to FIG. 1. FIG. 1 is a functional block diagram illustrating a configuration of a computer system 1 of the embodiment. FIG. 2 illustrates in detail a DRAM illustrated in FIG. 1.

As illustrated in FIG. 1, the computer system 1 has a CPU (central processing unit) 10, a DRAM 20, a non-volatile memory 30, a ROM 40, a graphics controller 50, a sound controller 60 and a bus 70 connecting the above portions one another.

The CPU 10 is an arithmetic device configured to perform various processes. More specifically, the CPU 10 reads from the ROM 40 and runs a BIOS (basic input output system) program 41 which will be described later upon the computer system 1 being activated, so as to check whether each kind of device such as the DRAM 20 has a defect. Moreover, the CPU 10 runs the BIOS program 41 so as to activate an OS (operating system) and to control each kind of device. The CPU 10 runs the BIOS program 41 so as to perform a memory use setting process for setting uses of memory blocks 201-210 (illustrated in FIG. 2).

The DRAM 20 is a main memory (primary memory device) of the computer system 1. More specifically, the DRAM 20 is used as a working memory in which a program (including the BIOS program 41) run by the CPU 10 is developed, or various data such as graphics data or voice data is temporarily stored. Moreover, as the DRAM 20 is used as the working memory of the CPU 10, the DRAM 20 is managed for each of the memory blocks 201-210 into which the area of the DRAM 20 is divided by a certain length, as illustrated in FIG. 2.

The BIOS program 41 run by the CPU 10 assigns each of the memory blocks 201-210 various kinds of uses as described later. The uses of the memory blocks 201-210 include various kinds of uses such as a use of developing a certain program, a use of developing graphics data or voice data and so on.

The non-volatile memory 30 is a rewritable and non-volatile storage medium such as a flash memory. The non-volatile memory 30 stores use setting data 31 indicating a use of each of the memory blocks 201-210 into which the area of the DRAM 20 is divided by a certain length, and works as a use setting data memory means. The use setting data 31 will be explained later in detail.

The ROM 40 stores various programs run by the CPU 10, data to be used for running the programs and so on. More specifically, the ROM 40 stores the BIOS program 41 that the CPU 10 reads and runs upon the computer system 1 being activated, and so on. Moreover, the ROM 40 stores a use setting table 42 that the CPU 10 uses for running the BIOS program 41. Moreover, the ROM 40 stores default use setting data 43 that presets a use of each of the memory blocks 201-210, and so on, so as to work as a default use memory means. The use setting table 42 and the default use setting data 43 will be explained later in detail.

The BIOS program 41 is a basic input output system. More specifically, the BIOS program 41 is activated upon power supplied to the computer system 1 being turned on, and is a control program for controlling the OS, application programs, and data input and output to and from the DRAM 20 and peripheral devices (a display, a keyboard and so on). Moreover, the BIOS program 41 is run by the CPU 10 so as to perform the memory use setting process for setting a use of each of the memory blocks 201-210 of the DRAM 20.

The graphics controller 50 generates graphics data as directed by the CPU 10 and stores the graphics data in a memory block for graphics in the DRAM 20. Moreover, the graphics controller 50 reads the graphics data stored in the memory block for graphics in the DRAM 20 and displays graphics on a display device (not illustrated).

The sound controller 60 generates voice data as directed by the CPU 10 and stores the voice data in a memory block for voice in the DRAM 20. Moreover, the sound controller 60 reads the voice data stored in the memory block for voice in the DRAM 20 and produces voice output through a speaker (not illustrated).

Figure 3:
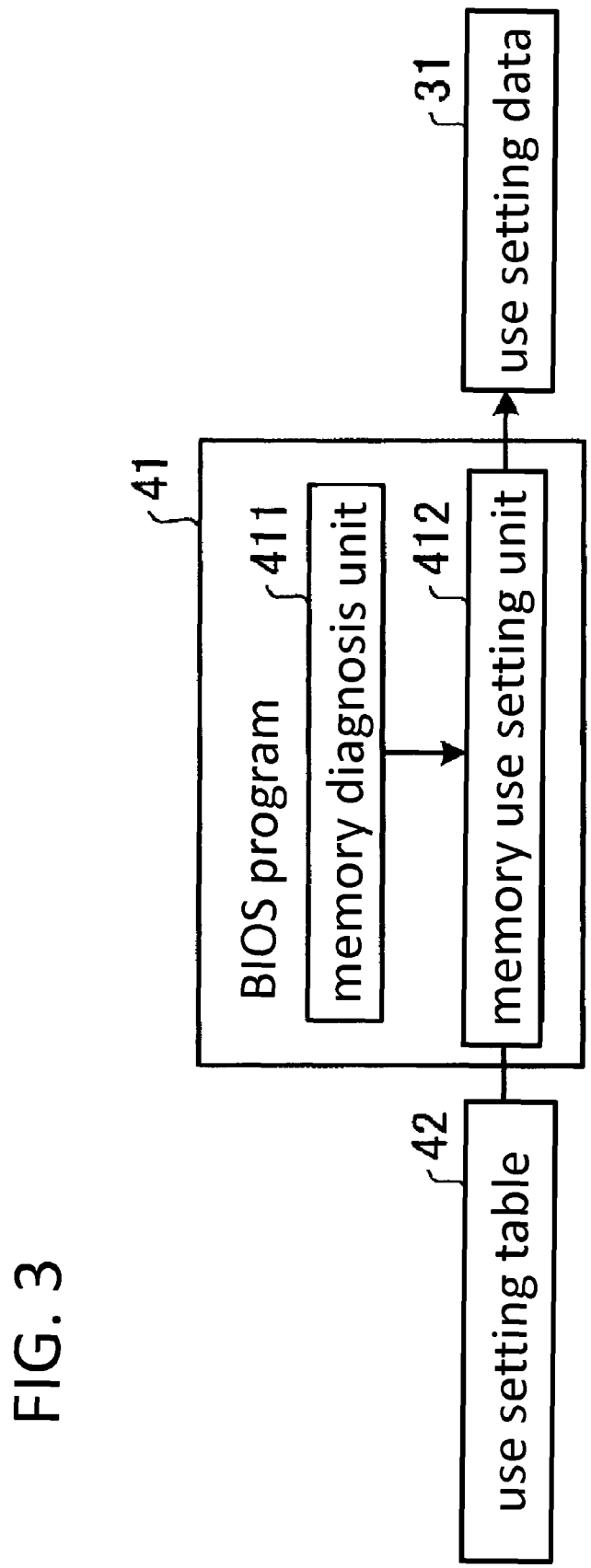
FIG. 3 is a functional block diagram illustrating in detail a BIOS program illustrated in FIG. 1.

Then, a configuration in which the BIOS program 41 illustrated in FIG. 1 performs the memory use setting process for setting a use to each of the memory blocks 201-210 in the DRAM 20 will be specifically explained in detail with reference to FIGS. 3-5. FIG. 3 is a functional block diagram illustrating details of the BIOS program 41 illustrated in FIG. 1. In FIG. 3, functions implemented upon the CPU 10 running the BIOS program 41 stored in the ROM 40 are illustrated as functional blocks.

As illustrated in FIG. 3, the BIOS program 41 has functional units which are a memory diagnosis unit 411 and a memory use setting unit 412. Each of the functional units 411 and 412 starts working upon the BIOS program being activated (being run).

The memory diagnosis unit 411 diagnoses the DRAM 20 so as to detect a bad area in each of the memory blocks 201-210. The bad area means an area in an individual memory block having a bad bit on which a memory function such as reading and writing data does not properly work. Detection of the bad area in each of the memory blocks by means of the memory diagnosis unit 411 includes detection of the number of bad bits included in the bad area.

The memory use setting unit 412 sets the use setting data 31 of each of the memory blocks 201-210 to be stored in the non-volatile memory 30 in accordance with a result of detecting the bad area in each of the memory blocks by means of the memory diagnosis unit 411. More specifically, the memory use setting unit 412 sets the use setting data 31 to be stored in the non-volatile memory 30 by using the use setting table 42 stored in the ROM 40.

Then, the CPU 10 references the use setting data 31 set by the memory use setting unit 412, and assigns a use to each of the memory blocks 201-210 on the basis of the use setting data 31.

FIG. 4 illustrates in detail the use setting data 31 illustrated in FIG. 1. FIG. 5 illustrates in detail the use setting table 42 illustrated in FIG. 1.

As illustrated in FIG. 4, the use setting data 31 stored in the non-volatile memory 30 indicates a use of each of the memory blocks 201-210 in the DRAM 20. The use setting data 31 includes the use of each of the memory blocks 201-210 written on an address of each of the memory blocks.

As to the use setting data 31 illustrated in FIG. 4, e.g., the memory block 201 is assigned a use "for programs", which indicates that the memory block 201 is used as a memory block for programs in which a certain program is developed. The memory blocks 203-205 are assigned uses "for graphics", which indicates that the memory blocks 203-205 are used as memory blocks for graphics data for storing graphics data. The memory block 207 is assigned a use "for voice", which indicates that the memory block 207 is used as a memory block for voice for storing voice data.

The default use setting data 43 illustrated in FIG. 1 presets a use of each of the memory blocks 201-210 in the DRAM 20, and gives initial (default) values of the use setting data 31. The default use setting data 43 includes, similarly as the use setting data 31, the use of each of the memory blocks 201-210 written on an address of each of the memory blocks.

As illustrated in FIG. 5, the use setting table 42 stored in the ROM 40 is a table including a memory quality level indicating quality of an individual memory block in the DRAM 20 and the use of the individual memory block associated with each other.

The memory quality level of an individual memory block in the DRAM 20 is specified by the number of bad bits included in the memory block, and is divided into three levels 1-3. The memory quality level "level 1" indicates that the memory block includes multiple bad bits. The memory quality level "level 2" indicates that the memory block includes a single bad bit. The memory quality level "level 3" indicates that the memory block includes no bad bits at all, i.e., the memory block is normal.

The use setting table 42 illustrated in FIG. 5 indicates that, if the memory quality level of the memory block is "level 1", the use of the memory block is set (changed) to the use for voice. It is indicated that, if the memory quality level of the memory block is "level 2", the use of the memory block is changed to the use for graphics data. It is indicated that, if the memory quality level of the memory block is "level 3", the use of the memory block is changed to the use for programs.

The memory quality level of the memory block for voice is lower than the memory quality level of the memory block for graphics, as noise of voice is hardly perceived by a person in comparison with noise of graphics (an image) in a case where the bad bit of the memory block causes such noise in the data.

If the memory diagnosis unit 411 detects a bad area including multiple bad bits in a memory block (i.e., the memory quality level is "level 1"), the memory use setting unit 412 described above sets the use setting data 31 corresponding to the memory block in which the bad area including the multiple bad bits is detected (called a multiple-bad-bit block hereafter) to indicate that the memory block is used as a memory block for voice for storing voice data. That is, the memory use setting unit 412 changes the use of the multiple-bad-bit block to the use for voice with reference to the use setting table 42.

If the memory diagnosis unit 411 detects a bad area including a single bad bit in a memory block (i.e., the memory quality level is "level 2"), the memory use setting unit 412 sets the use setting data 31 corresponding to the memory block in which the bad area including the single bad bit is detected in the DRAM 20 (called a single-bad-bit block hereafter) to indicate that the memory block is used as a memory block for image data for storing image data. That is, the memory use setting unit 412 changes the use of the single-bad-bit block to the use for image data with reference to the use setting table 42.

If the memory diagnosis unit 411 detects no bad area at all (i.e., the memory quality level is "level 3"), the memory use setting unit 412 sets the use setting data 31 corresponding to the memory block in which no bad area is detected at all in the DRAM 20 (normal block) to indicate that the memory block is used as a memory block for programs for developing a certain program. That is, the memory use setting unit 412 changes the use of the normal block to the use for programs with reference to the use setting table 42.

The above functional units 411 and 412 start their processes upon the computer system 1 being activated, and more specifically, upon the BIOS program 41 being activated. In a case where the use setting data 31 is already set for each of the memory blocks 201-210 before the process starts, it is allowable that the use setting data 31 is not set in accordance with a result of detecting a bad area in each of the memory blocks by means of the memory diagnosis unit 411. In other words, if the BIOS program 41 sets a use to each of the memory blocks 201-210 by means of the memory use setting unit 411 after being activated the last time, the BIOS program 41 may omit the memory diagnosis unit 411 and the memory use setting unit 412 from working upon being activated next.

Then, a procedure in which the memory use setting unit 412 sets the use setting data 31 will be explained further in detail with reference to FIGS. 6 and 7. FIG. 6 illustrates an example of the procedure in which the memory use setting unit 412 sets the use setting data 31. FIG. 6 illustrates a case where the use setting data 31 illustrated in FIG. 4 is changed. It is assumed, in the use setting data 31 illustrated in FIG. 4, that the uses of three memory blocks 203-205 are preset to the use for programs, and that the use of one memory block 207 is preset to the use for voice.

As the memory diagnosis unit 411 diagnoses the memory quality level of the memory block 210 as "level 1", as illustrated in FIG. 6, the memory use setting unit 412 sets (changes) the use of the memory block 210 from "for programs" to "for voice" with reference to the use setting table 42 illustrated in FIG. 5. As the memory diagnosis unit 411 diagnoses the memory quality level of the memory block 202 as "level 2", the memory use setting unit 412 changes the use of the memory block 202 from "for programs" to "for graphics". As a result, while the memory blocks "for voice" and the memory blocks "for graphics" each increase by one, the memory blocks "for programs" decrease by two. Thus, the memory use setting unit 412 changes the uses of two memory blocks 205 and 207, for which the memory quality level is diagnosed as "level 3" by the memory diagnosis unit 411, from "for graphics" and "for voice" to "for programs", respectively. The DRAM 20 may thereby be compensated for the decrease of the memory blocks for programs, and each of the memory blocks included in the DRAM 20 may be effectively used.

FIG. 7 illustrates another example of the procedure in which the memory use setting unit 412 sets the use setting data 31. FIG. 7 illustrates a case where the use setting data 31 illustrated in FIG. 4 is changed.

As the memory diagnosis unit 411 diagnoses the memory quality level of the memory block 202 as "level 2", as illustrated in FIG. 7, the memory use setting unit 412 changes the use of the memory block 202 from "for programs" to "for graphics" with reference to the use setting table 42 illustrated in FIG. 5. As the memory diagnosis unit 411 diagnoses the memory quality level of the memory block 204 as "level 2", the memory use setting unit 412 maintains the use of the memory block 20 "for graphics". As the memory diagnosis unit 411 diagnoses the memory quality level of the memory block 203 as "level 3", then, the memory use setting unit 412 supposedly changes the use of the memory block 203 from "for graphics" to "for programs".

In the above case, though, the memory block 202 of the memory quality level "level 2" and the memory block 204 of the memory quality level "level 2" are not adjacent to each other. That is a case where the memory diagnosis unit 411 detects a plurality of memory blocks having bad areas (memory blocks 202 and 204 in the above case) and the plural memory blocks having the bad areas are arranged on addresses which are not adjacent to each other. In the above case, the memory use setting unit 412 exceptionally sets the use setting data 31 corresponding to another memory block existing between the above memory blocks to indicate that the memory block is used as a memory block for graphics. As illustrated in FIG. 7, e.g., the memory use setting unit 412 sets the uses of the memory blocks 202 and 204, and of the memory block 203 existing between the two memory blocks 202 and 204, equally to "for graphics".

If the memory diagnosis unit 411 detects a plurality of the memory blocks of the memory quality level "level 2" (single-bad-bit blocks) and the plural single-bad-bit blocks are not adjacent to one another, as described above, the memory use setting unit 412 changes in the DRAM 20 the plural single-bad-bit blocks and a memory block existing between the plural single-bad-bit blocks to the memory blocks for "graphics". Thus, even in a case where graphics data of a significant size is stored in the DRAM 20, the computer system 1 may store the graphics data in a continuous area formed by a plurality of the memory blocks, and may reduce time for reading and writing the graphics data.

Then, the memory use setting process of the computer system 1 illustrated in FIG. 1 will be explained with reference to FIG. 8. FIG. 8 is a flowchart illustrating the memory use setting process of the computer system 1 illustrated in FIG. 1. The CPU 10 reads from the ROM 40 and runs the BIOS program 41 after the power supplied to the computer system 1 is turned on so that the memory use setting process illustrated in FIG. 8 is performed.

As illustrated in FIG. 8, the BIOS program 41 first judges whether the use setting data 31 set (changed) by the memory use setting unit 412 is stored in the non-volatile memory 30 (step S10).

As a result of the judgment, upon judging that the use setting data 31 changed by the memory use setting unit 412 is stored in the non-volatile memory 30 (step S10: Yes), that is, upon judging that a use is set to each of the memory blocks 201-210 by the memory use setting unit 412 after being activated the last time, the BIOS program 41 forwards the process to a step S16. Meanwhile, as a result of the judgment, upon judging that the use setting data 31 set by the memory use setting unit 412 is not stored in the non-volatile memory 30 (step S10: No), the BIOS program 41 forwards the process to a step S11.

At the step S11, the memory diagnosis unit 411 of the BIOS program 41 diagnoses each one of all the memory blocks 201-210 so as to detect a bad area in each of the memory blocks 201-210 (step 511).

Then, the memory diagnosis unit 411 performs a process for relating a memory diagnosis result of detecting a bad area in each of the memory blocks 201-210 to the address data of each of the memory blocks 201-210 in the DRAM 20 (step S12).

Next, the memory diagnosis unit 411 judges whether there is a memory block that has not been diagnosed in the DRAM 20 (step S13). So as to make the above judgment, the memory diagnosis unit 411 judges whether a memory diagnosis result is related to the address data of each of the memory blocks 201-210 of the DRAM 20. Upon judging that there is a memory block that has not been diagnosed in the DRAM 20 (step S13: Yes), the memory diagnosis unit 411 repeats the process from S11 to S13 until there is no memory block that has not been diagnosed in the DRAM 20.

Meanwhile, upon judging that there is no memory block that has not been diagnosed in the DRAM 20 (step S13: No), the memory diagnosis unit 411 judges whether a bad area is detected in each of the memory blocks 201-210 in the DRAM 20 (step S14). As a result of the judgment, upon judging that a bad area was detected in at least one of the memory blocks 201-210 in the DRAM 20 (step S14: Yes), the memory diagnosis unit 411 forwards the process to a step S15.

Then, the memory use setting unit 412 sets (changes) the use setting data 31 stored in the ROM 40 with reference to the use setting table 42 (step S15), and forwards the process to a step S17.

Meanwhile, upon judging that no bad area was detected in each of the memory blocks 201-210 (step S14: No), the memory diagnosis unit 411 forwards the process to a step S16. Then, the memory use setting unit 412 sets (changes) the use setting data 31 stored in the ROM 40 on the basis of the default use setting data 43 stored in the non-volatile memory 30 (step S16), and forwards the process to the step S17. That is, the default use setting data 43 is copied into the use setting data 31 as a default value at the step S16.

The BIOS program 41 assigns a use to each of the memory blocks 201-210 on the basis of the use setting data 31 set at the step S15 or S16, and ends the memory use setting process.

As described above, the use setting data 31, which indicates a use of each of the memory blocks 201-210 into which the area of the DRAM 20 of the embodiment is divided by a certain length, is stored in the non-volatile memory 30. The DRAM 20 is diagnosed so that a bad area is detected in each of the memory blocks 201-210. The use setting data of each of the memory blocks 201-210 stored in the non-volatile memory 30 is set in accordance with a result of detecting a bad area in each of the memory blocks 201-210.

It is generally known that graphics or voice data may be reproduced even if they include some data lack or data error, as long as high integrity is not requested. On the contrary, a program including some data lack or data error never works properly. The embodiment applies the above characteristics. That is, as to the embodiment, a bad block is set as a graphics memory (memory block for image data), and a normal block is set as a main memory in which a program resides (memory block for a program). A bad block is used as a portion of the memory so that the memory may be effectively used.

As the computer system of the embodiment is configured as described above, the computer system assign a proper use not only to a normal memory block of the main memory but also to a slightly bad block in which the number of bad bits is relatively small, so as to effectively use each of the memory blocks included in the main memory.

The BIOS program 41 of the embodiment is not limited to the one stored in the ROM 40, and may be stored in a rewritable non-volatile memory such as a flash memory so that the CPU 10 reads and runs the program. Moreover, the BIOS program 41 of the embodiment may be downloaded from a server connected to a network to the flash memory, or further may be recorded on a record medium such as a CD-ROM and loaded to the flash memory through a drive of the record medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer system comprising:
   a memory configured to store various kinds of data;
   a use setting data memory configured to store use setting data indicating that each of a plurality of memory blocks into which the memory is divided by a certain length is used as a memory block for storing at least one of image data, voice data or program data;
   a memory diagnosis unit configured to diagnose the memory so as to detect a bad bit causing data lack or data error for the image data, the voice data and the program data in each of the memory blocks; and
   a memory use setting unit configured to set the use setting data of each of the memory blocks stored in the use setting data memory in accordance with a result of detecting the bad bit causing data lack or data error in each of the memory blocks by the memory diagnosis unit,
   wherein the use setting data of the memory block including bad bits is set for voice data, the use setting data of the memory block including a bad bit is set for image data, and the use setting data of the memory block including no bad bit is set for program.

2. The computer system according to claim 1,
   wherein the memory use setting unit sets the use setting data according to the memory block existing between the memory blocks in which the bad bit causing data lack or data error is detected by the memory diagnosis unit to indicate that the memory block existing between the memory blocks is used as a memory block for storing the image data.

3. The computer system according to claim 1, further comprising:
   a default use setting unit for storing default use setting data indicating a default use setting data of each of a plurality of the memory blocks into which the memory is divided by a certain length, wherein the memory use setting unit sets the use setting data based on the default use setting data indicating a default use setting data of each of a plurality of the memory blocks when the bad bit causing data lack or data error is not detected in all the memory blocks by the memory diagnosis unit.

4. The computer system according to claim 1,
   wherein the memory use setting unit does not sets the use setting data in accordance with a result of detecting the bad bit causing data lack or data error in each of the memory blocks by the memory diagnosis unit when the use setting data is set for all the memory blocks before performing a process.

5. A computer readable, non transitory medium that stores a memory use setting program configured to instruct a computer, having a memory and a use setting data memory for storing use setting data indicating a use of each of a plurality of memory blocks, to execute a procedure for setting use setting data of each of memory blocks in the memory, the use of each of the plurality of memory blocks being at least one of the storage of image data, the storage of voice data or the storage of program data, the procedure comprising:
   detecting a bad bit causing data lack or data error for the image data, the voice data and the program data in each of the memory blocks by diagnosing the memory;
   setting the use setting data of each of the memory blocks stored in the use setting data memory in accordance with a result of the detecting the bad bit causing data lack or data error in each of the memory blocks,
   wherein the use setting data of the memory block detected bad bits is set for voice data, the use setting data of the memory block detected a bad bit is set for image data, and the use setting data of the memory block detected no bad bit is set for program.

* * * * *